F. MANLEY.
GRADE CONTROLLED AUXILIARY AIR VALVE FOR INTERNAL COMBUSTION ENGINES.
APPLICATION FILED APR. 23, 1917.
1,272,285.
Patented July 9, 1918.
2 SHEETS—SHEET 1.
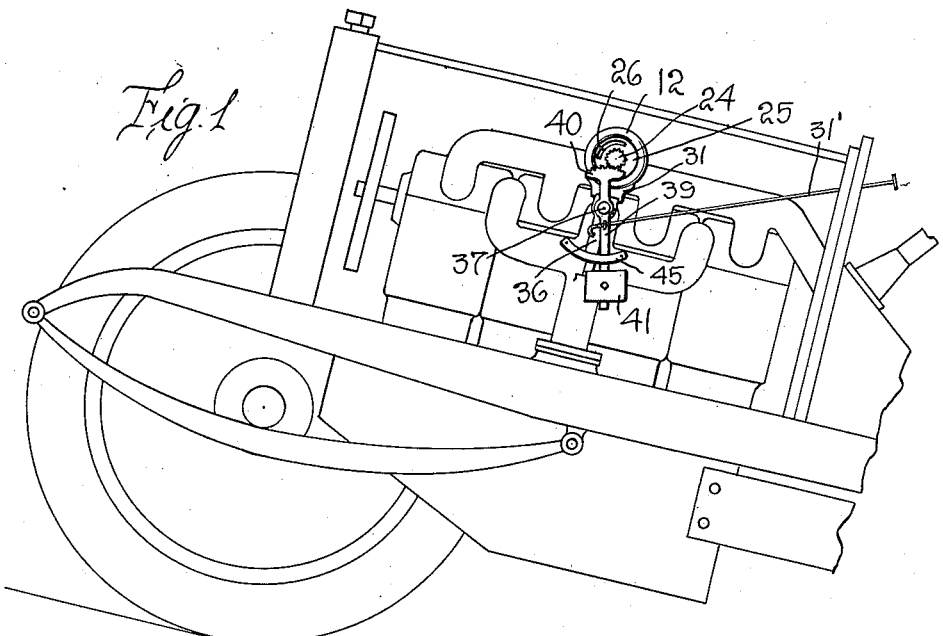
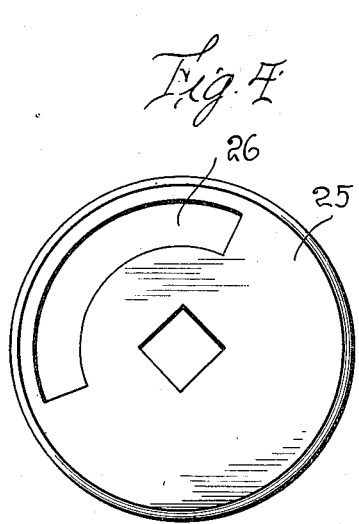
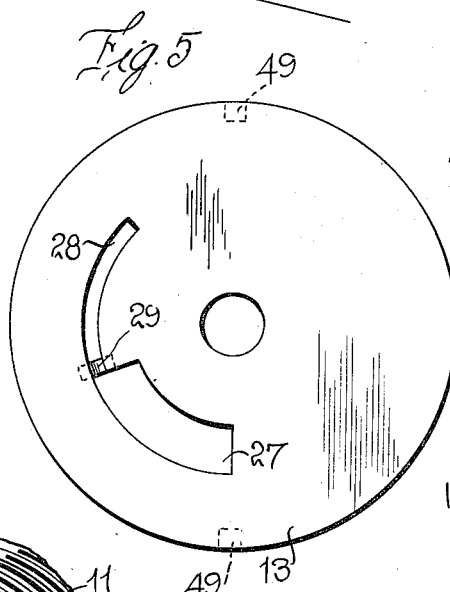
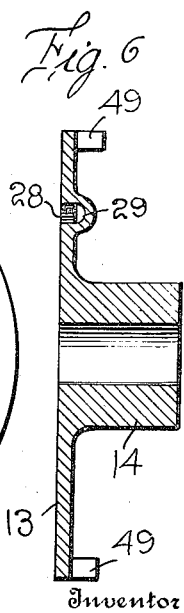
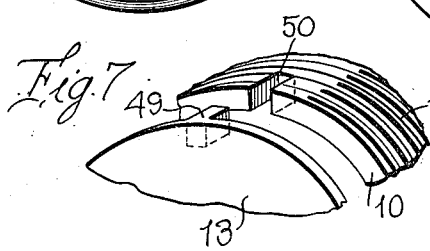
Inventor
FRANK MANLEY
By Watson E. Coleman
Attorney

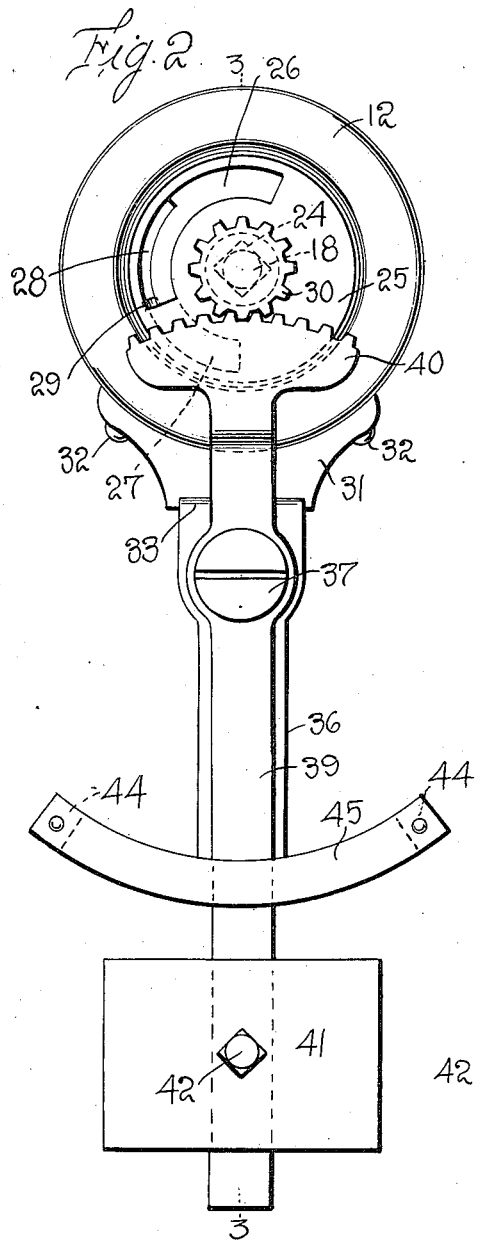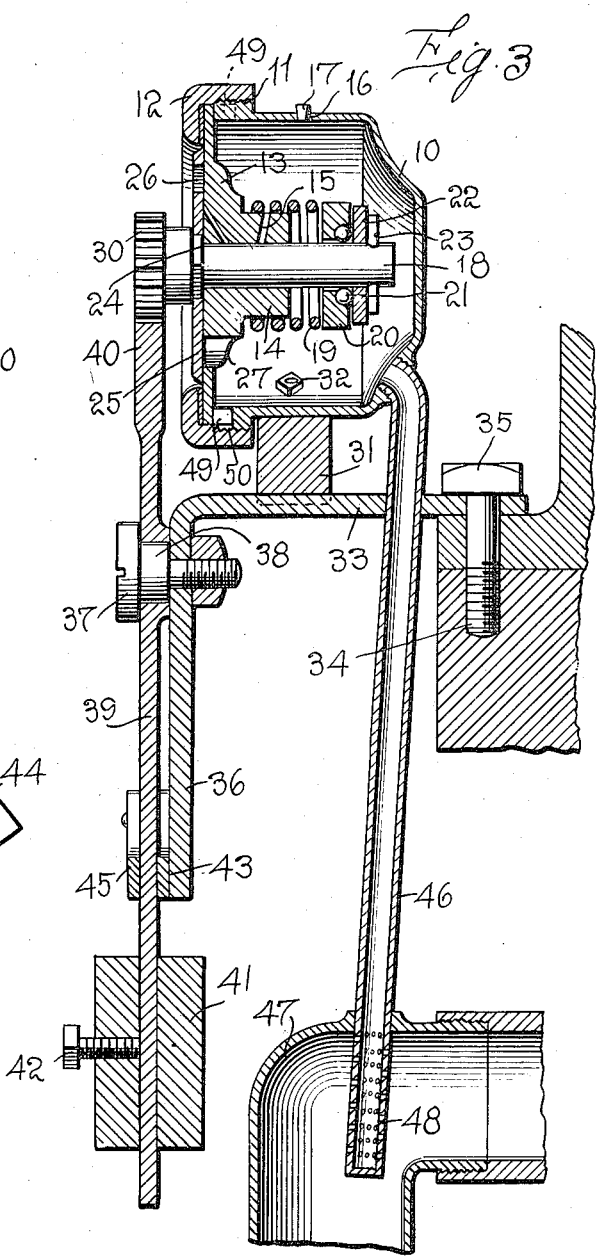

UNITED STATES PATENT OFFICE.

FRANK MANLEY, OF SILVERTON, COLORADO.

GRADE-CONTROLLED AUXILIARY AIR-VALVE FOR INTERNAL-COMBUSTION ENGINES.

1,272,285. Specification of Letters Patent. Patented July 9, 1918.

Application filed April 23, 1917. Serial No. 164,036.

*To all whom it may concern:*

Be it known that I, FRANK MANLEY, a citizen of the United States, residing at Silverton, in the county of San Juan and State of Colorado, have invented certain new and useful Improvements in Grade-Controlled Auxiliary Air-Valves for Internal-Combustion Engines, of which the following is a specification, reference being had to the accompanying drawings.

This invention relates to internal combustion engines, and particularly to means for controlling the air passing through the carbureter in which the operation of the controlling means is in turn controlled by the grade of the road, so that if, for instance, the car is going up hill, or the grade increases, the amount of air passing to the carbureter will be reduced, thus increasing the richness of the mixture, while, on the contrary, if the car moves from a level onto a down grade, the amount of air will be decreased, thus decreasing the richness of the mixture, until at a predetermined grade of inclination, a very large amount of air is admitted to the carbureter, so as to practically cause the charge to be entirely composed of air, thus permitting the engine to run free and act as a brake.

Still another object is to provide means whereby the driver of the car may operate the air controlling valve manually, if desired.

A further object is to improve the details of construction of mechanism of this character and provide a relatively small, compact, and automatically operating air control which does not depend upon the judgment of the operator, but may act entirely automatically to decrease or increase the amount of air passing into the carbureter.

Other objects will appear in the course of the following description.

My invention is illustrated in the accompanying drawings, wherein:—

Figure 1 is a side elevation of a forward portion of an automobile with my air regulating device applied thereto;

Fig. 2 is a front elevation of the air controller or regulator;

Fig. 3 is a longitudinal sectional view of the construction illustrated in Fig. 2;

Fig. 4 is a face view of the plate 25;

Fig. 5 is a face view of the plate 13;

Fig. 6 is a diametrical sectional view through the plate 13; and

Fig. 7 is a fragmentary perspective view of a portion of the shell 10 and the plate 13.

Referring to these drawings, 10 designates a hollow shell of any suitable form, and which is open at its forward end and has an annular flange, screw-threaded as at 11, for engagement with a locking ring 12, which is angular in cross section. The open front of this casing 10 is closed by a plate 13, formed with a hub 14, constituting a bearing, this hub being provided with an oil-hole 15 and the shell being provided with an oil-hole 16 and a plug 17, whereby the parts may be oiled.

Passing through the hub 14, which constitutes the bearing therefor, is a shaft or stem 18, which rotates within this hub or bearing. The hub 14 is reduced in diameter toward its rear end and surrounding this reduced end is a coiled spring 19 which extends beyond the hub and bears against the annular ball carrier 20, formed with a raceway for anti-friction balls or bearings 21. A cap 22 loosely fits over the inner end of the stem 18 and bears against these ball bearings and this cap is held in place by a pin 23, which is passed through a perforation in the end of the stem 18. It will be understood that when this pin 23 is in place it forces the cap 22 against the balls 21 and forces the ball carrier 20 against the spring 19, compressing this spring so that the spring will exert an inward pressure on the shaft or stem 18 to urge the enlarged end of the shaft or stem toward the plate 13. The shaft or stem 18 is formed with a square portion 24 and mounted upon this square portion of the shaft is a plate 25 formed with an arcuate and relatively wide slot 26, which extends somewhat less than half way around the plate. It will thus be seen that the plate will rotate with the stem 18 and will be held firmly against the plate 13. The plate 13 is provided with a relatively wide arcuate slot 27, which at one end is extended in the form of an arcuate and relatively narrow slot 28. The combined lengths of the portions 27 and 28 equal the length of the slot 26. Preferably, and in order that the plate 13 may not be weakened by the relatively long slot, I provide a bridge 29 at the junction of the relatively narrow slot 28 with the relatively wide slot, this bridge arching over the slot 28 and being disposed on the inside face of the plate. Mounted upon the shaft or stem 18 or formed in one piece therewith is a pinion 30. The shell 10 is supported by means of a bed piece 31, which is arcuately curved to provide a seat for the casing or shell 10, the shell being held to this seat by means of screws 32. The bed piece 31 is attached to or formed with an angular bracket 33, the upper portion of which extends rearward beneath the shell 10 and is attached to any suitable support 34 by means of the screw 35 or in any other suitable manner. The bracket 33, at its forward end, extends downward as at 36, and passing through this bracket is a headed screw 37 formed with a cylindrical portion 38, which rests against the face end bracket when the screw is in place. Oscillating upon this cylindrical portion 37 is a pendulum 39, whose upper end is formed with a sector gear 40, having teeth meshing with the pinion 30, which pendulum carries at its lower end the weight 41, which is adjustably supported upon the pendulum by means of the screw 42. Preferably, the lower end of the portion 36 of the bracket 33 is formed with an arcuate guide 43 and supported in spaced relation to this guide 43, by blocks 44, is a guide bar 45. The bar 43 and the bar 45 together constitute a guide between which the pendulum oscillates, this guide preventing movements of the pendulum other than movements of oscillation, but permitting free oscillation of the pendulum.

Extending from the shell or casing 10 is a pipe 46, which leads into the carbureter manifold 47, this pipe being preferably formed at the end which projects into the manifold, with fine perforations or with a screen formed in any other suitable manner. This perforated portion of the pipe is designated 48.

The operation of my invention will be plain from the above description. When the car is running on level ground, the pendulum occupies a neutral position, with the narrow portion of the slot 28 or the slot 27 exposed through the slot 26. Practically the whole area of the slot 28 is exposed and at this time the normal amount of air is being allowed to pass through the slots 28 and 26 into the interior of the shell 10, thence down through the pipe 46 into the carbureter manifold. If, now, however, the car strikes a down grade, the pendulum will swing in a direction to rotate the pinion 30 to cause the bolt 25 to turn, so as to expose a portion of the enlarged slot 27, thus increasing the amount of air passing into the carbureter and decreasing the richness of the mixture. If the inclination of the grade remains the same, the effective air opening will remain the same, but if the inclination increases, the valve 25 will continue to open more and more, thus increasing still further the amount of air admitted to the carbureter and still further increasing the amount of air until if the grade is particularly steep, such a very large portion of air will be admitted to the carbureter manifold, that the engine will practically operate on air and nothing else, the engine, under these circumstances, acting as a brake.

If, after running upon a level, the car commences to climb a grade, if the grade is small, the pendulum will swing to such a position as to shift the valve 25 from the position shown in Fig. 2 to gradually cut down the effective area of the slot 28 and if the grade increases, this effective area is cut down further and further, thus increasing the richness of the mixture and securing more power. It will be obvious that the relative lengths of the slots 27 and 28 may be so regulated as to provide for just the right mixture for various grades and, further, it will be obvious that the plate 13 which constitutes the seat of a valve 25 may be adjusted upon the casing 10 so as to adjust the point at which the end of the slot 26 will move past the junction between the slots 28 and 27 and the point at which full closure or full opening of the air valve will occur.

To this end I have provided the ring 12 heretofore referred to which ring is angular in form and extends over the plate 13 and holds it in place. Where no adjustment of the plate 13 is required, this plate is preferably provided with lugs 49, which extend into recesses 50 in the end face of the casing 10. It will be obvious, however, that these recesses 50 might be increased in number and placed at uniform distances around the end face of the casing 10 and thus permit the ring to be adjusted.

For the purpose of manually operating the pendulum 39 and thus manually controlling the valve 25, I may provide any suitable device capable of engaging with or being disengaged from the pendulum and when engaged with the pendulum shifting the pendulum from one side to the other. There is shown for this purpose, however, a hooked rod 51, which extends to the dash board in reach of the driver, so that in the case of muddy or sandy roads, the driver may close off the air intake slot 28 to any degree required and giving a richer mixture and more power when needed. This is the only time that the driver has to operate the pendulum by hand. At all other times, the device is automatic in its action and always gives the proper mixture for the grade of the road, thus insuring the free intake of air, thereby giving good compression, more power, a cooler engine, and using less gasolene.

It will be seen that with this appliance, on going up a grade of say 3%, the free air intake will close automatically and cause the piston of the engine to draw more gas through the carbureter, thus enriching the charge and giving more power to the engine on an upgrade. The steeper the grade, the greater the reduction in the free air intake, and the more power the engine has. On the other hand, going down hill, the free air intake is opened automatically thus thinning the mixture and giving less power to the engine, until if a certain grade be reached, then the wider part of the air intake opening in the plate 13 is exposed and the engine gets nothing but clear air and stops firing. Under these circumstances it acts as a brake, even better than it would under ordinary circumstances, as it will have plenty of free air and, therefore, have better compression and thus furnishing more resistance to the movement of the machine.

The peculiar form of the arcuate slot 27—28 is of very great importance in my construction, as it is necessary that the valve shall not open too fast or close too fast. In my construction the arcuate slot 27—28 has a wide portion 27 and a narrow portion 28. The narrow portion of the slot is used on ordinary roads thus giving a uniform mixture, and the wide portion of the slot is only used on a steep grade, that is a down grade. Then the wide portion 27 of the opening is uncovered and the engine draws in so much pure air that the charge ceases to explode and acts as a brake and, as the engine gets a full charge of pure air and no gas, a good compression is secured and a good braking action. The narrow portion 28 of the slot in plate 13 gives an even regulation to the mixture until a certain down grade is reached and then the wide opening 27 is uncovered and no gas is used at all and therefore no power is wasted.

While I have illustrated the form of my invention which I believe to be extremely effective in practice, it is obvious that I do not wish to be limited to the details of construction, as these may be varied in many ways, without departing from the spirit of the invention.

Having described my invention, what I claim is:—

1. In a motor vehicle, a casing having a pipe communicating with the intake manifold of a vehicle, said casing having upon one wall thereof, an arcuate slot, the slot for a portion of its length having a predetermined width and for another portion of its length having a different width, the walls of both portions of the slot being parallel, a rotatable valve plate having an arcuate opening coacting with the arcuate opening in the wall of the casing, a pendulum mounted for oscillation in a vertical plane parallel to the line of movement of the vehicle, and means operatively connecting the pendulum to the valve plate to rotate the latter in correspondence with the relative movements of the pendulum.

2. In a motor vehicle, an intake manifold, a casing communicating with the manifold and having one wall formed with an arcuate slot, a portion of the slot being relatively narrow and the remainder of the slot being relatively wide, wide and narrow portions of the slot having approximately parallel walls, a rotatable valve plate coacting with the wall of the casing and having an arcuate opening of a length equal to the total length of the slot in the wall coacting therewith, a pendulum mounted for oscillation in a vertical plane in the direction of movement of the vehicle, and means operatively connecting the pendulum to the valve plate to cause the shifting of the valve plate in correspondence with the movements of the valve plate relative to the vehicle, due to difference in grade.

3. A controlling device of the character described, including a casing having in one wall an arcuate slot and having means whereby it may be connected to the intake manifold of an engine, a valve plate disposed against the slotted face of the casing and rotatably mounted and having an arcuate slot coacting with the slot in the casing, a bracket supporting the casing, a pendulum mounted upon the bracket for oscillation in a plane parallel to the face of the casing, said pendulum having a sector gear, and a pinion engaged by the sector gear and operatively engaged with said plate.

4. A controlling device of the character described, including a casing having in one wall an arcuate slot and having means whereby it may be connected to the intake manifold of an engine, a valve plate disposed against the slotted face of the casing and rotatably mounted and having an arcuate slot coacting with the slot in the casing, a bracket supporting the casing, a pendulum mounted upon the bracket for oscillation in a plane parallel to the face of the casing, said pendulum having a sector gear, a pinion engaged by the sector gear and operatively engaged with said plate, and laterally disposed guides between which said pinion oscillates.

5. In a device of the character described, a casing having a pipe leading therefrom adapted to be connected to the intake manifold of an internal combustion engine, a face plate detachably mounted on the casing and having a central hub and having an arcuate slot, a portion of the slot being relatively narrow and the remainder of the slot relatively wide, a pinion having a stem rotatably mounted in said hub, a valve plate mounted upon said stem and rotatable therewith against the face plate and having an arcuate slot coacting with the slot in the face plate, and a pendulum operatively supported in connection with the casing and having a sector gear engaging with the pinion, said pendulum being disposed in a vertical plane.

6. In a device of the character described, a casing having a pipe leading therefrom adapted to be connected to the intake manifold of an internal combustion engine, a face plate detachably mounted on the casing and having a central hub, a pinion having a stem rotatably mounted in said hub, a valve plate mounted upon said stem and rotatable therewith against the face plate and having an arcuate slot coacting with the slot in the face plate, a pendulum operatively supported in connection with the casing and having a sector gear engaging with the pinion, said pendulum being disposed in a vertical plane, a coil spring surrounding the hub, a ball carrier loosely surrounding the stem and against which said spring bears, a washer mounted on the stem and confronting the ball carrier, and means on the stem bearing against said washer and placing the spring under compression.

7. In a device of the character described, a casing adapted to communicate with the intake pipe of an internal combustion engine, a plate adapted to form one wall of the casing and having an air opening and a centrally disposed inwardly projecting hub, an angular ring detachably engaging the casing and holding the plate in place, a stem extending through the hub of the face plate and rotatable therein, a valve plate mounted on the stem for rotation therewith and having an opening coacting with the opening in the face plate, a pinion formed on the stem, a bracket forming a support for the casing and having a downwardly extending member, a pendulum pivotally supported upon the bracket and having a sector gear engaging with the pinion, the lower end of the pendulum being weighted, and guides mounted on the bracket through which said pendulum passes.

8. In a device of the character described, a casing, a plate forming one wall thereof and having an opening, the plate at its margins being provided with inwardly projecting lugs, the wall having recesses into which said lugs may project, a ring having a screw-threaded engagement with the wall of the casing to thereby lock the plate and casing in conjoined relation, a stem rotatably mounted in the plate, a valve mounted to rotate with the stem and controlling passage through the opening in the plate, and a pendulum operatively connected to said valve.

9. In a motor vehicle, a casing having a pipe communicating with the intake manifold of a vehicle, the casing having in one wall thereof an arcuate slot, a portion of the slot being relatively wide and the remainder of the slot relatively narrow, said wide and narrow portions of the slot having approximately parallel side walls, and a rotatable valve plate having an arcuate opening coacting with the arcuate opening in the wall of the casing, and means for rotating the valve plate relative to the casing.

10. In a motor vehicle, a casing having a pipe communicating with the intake manifold of a vehicle, the casing having in one wall thereof an arcuate slot, a portion of the slot being relatively wide and the remainder of the slot relatively narrow, said wide and narrow portions of the slot having approximately parallel side walls, a rotatable valve plate having an arcuate opening coacting with the arcuate opening in the wall of the casing, and means for rotating the valve plate relative to the casing, said means including a pendulum mounted for oscillation in the line of the vehicle and operatively connected to the valve plate, the relative movement of the pendulum in one direction cutting down the amount of air admitted and in the other direction increasing the amount of air admitted.

11. In a motor vehicle, a casing having a pipe communicating with the intake manifold of a vehicle, said casing having in one wall thereof an arcuate slot, and a rotatable valve plate having an arcuate slot coacting with a slot in the wall of the casing, both of said slots having the same length, and one of said slots for a portion of its length having a uniform width equal to the width of the other slot and for the remainder of its length having a uniform width less than the width of the other slot, and means for rotating the valve plate relative to the casing to thereby cause a more or less complete registry of said slots.

In testimony whereof I hereunto affix my signature in the presence of two witnesses.

FRANK MANLEY.

Witnesses:
 CHAS. SCHERR,.
 H. R. MCELHANEY.